United States Patent
Lattard et al.

(10) Patent No.: US 6,349,109 B1
(45) Date of Patent: Feb. 19, 2002

(54) DIRECT SEQUENCE SPREAD SPECTRUM DIFFERENTIAL RECEIVER WITH MIXED INTERFERENCE SIGNAL FORMATION MEANS

(75) Inventors: Didier Lattard, Rencurel; Jean-René Lequepeys, Fontaine; Didier Varreau, St. Georges de Commiers; Norbert Daniele, Montbonnot, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/166,542

(22) Filed: Oct. 5, 1998

(30) Foreign Application Priority Data

Oct. 22, 1997 (FR) .............................. 97 13239

(51) Int. Cl.[7] .......................... H04B 15/00; H04K 1/00; H04L 27/30
(52) U.S. Cl. ...................... 375/140; 375/143; 375/142; 375/150; 375/152
(58) Field of Search ................................ 375/140, 143, 375/144, 147, 148, 150, 152, 130, 343, 346, 330, 331, 142; 370/342

(56) References Cited

U.S. PATENT DOCUMENTS

| 5,553,062 A | | 9/1996 | Schilling et al. | |
| 5,799,035 A | * | 8/1998 | Lattard et al. | 375/206 |
| 6,115,413 A | * | 9/2000 | Lattard et al. | 375/200 |

FOREIGN PATENT DOCUMENTS

| EP | 0 491 668 | 6/1992 |
| EP | 0 778 677 | 6/1997 |

* cited by examiner

*Primary Examiner*—Mohammad H. Ghayour
(74) *Attorney, Agent, or Firm*—Oblon, Spivak, McClelland, Maier & Neustadt, P.C.

(57) ABSTRACT

In order to obtain the signals necessary for the formation of an interference signal corresponding to the multiple access noise, use is made both of the non-coherent part of the receiver, namely the differential demodulation device, and the coherent part thereof, namely the two matched filters performing the correlations. This gives a reliable, precise, clock symbol signal (Hs) and also the reconstituted data (D(I), D(Q)) and the amplitudes of the signals in the two channels (A(I), A(Q)). Formation then takes place of the correction signal by respreading the data (D(I), D(Q)) and the weighting the respread data by the amplitudes (A(I), A(Q)).

5 Claims, 9 Drawing Sheets

DIRECT SEQUENCE SPREAD SPECTRUM DIFFERENTIAL RECEIVER WITH MIXED INTERFERENCE SIGNAL FORMATION MEANS

TECHNICAL FIELD

The present invention relates to a direct sequence spread spectrum differential receiver with mixed means for forming an interference signal corresponding to the multiple access noise.

PRIOR ART

The direct sequence spread spectrum modulation technique has been used for many years, particularly in radio-communications with satellites and in the military sector.

In a digital data emitter using a conventional modulation technique, the data to be emitted modulate a radio-frequency carrier. The modulation used can be a phase, frequency, amplitude or mixed modulation. In order to simplify the description, reference will only be made to phase modulations, which are now the most frequently used.

The digital data to be transmitted consist of binary elements or bits, which have a period $T_b$, i.e. a new bit must be transmitted every $T_b$. With said bits it is possible to form bit groups, also known as symbols, whose period is $T_s$ and is a multiple of $T_b$. These symbols will modulate the radio-frequency carrier, e.g. in phase.

This technique can be illustrated by two phase modulation examples:

a) The modulation known as binary phase shift keying or BPSK, which consists of allocating a phase state, e.g. 0, to the 0 bits, and a phase state $\pi$ to the 1 bits. In this case the symbol is the actual bit ($T_s=T_b$) and the radio-frequency carrier phase state is imposed on every bit.

b) Modulation known as quaternary phase shift keying or QPSK, which consists of using symbols formed by two successive bits, so that said symbols can assume four states (00, 01, 10, 11). A state of the phase of the carrier is allocated to each of these states, in this case $T_s=2T_b$ and the radio-frequency carrier phase state is imposed on every other bit.

On the reception side, it is necessary to demodulate the signal received. A distinction can be made between two major demodulation families, namely coherent demodulation and non-coherent demodulation. The coherent demodulation technique consists of implementing, in the receiver, a subassembly, whose function is to estimate the mean phase of the carrier, so as to reconstitute a phase reference, which is then mixed with the signal received in order to demodulate the data.

The non-coherent demodulation technique is based on the observation, according to which it is sufficient for the phase reference of the symbol to be compared with the phase of the preceding symbol. In this case, instead of estimating the phase of the symbols, the receiver estimates the phase difference between two successive symbols. This is a differential phase shift keying or DPSK or a differential quadrature phase shift keying or DQPSK.

The attached FIGS. 1 to 3 diagrammatically show the structure and operation of a spread spectrum emitter and receiver operating in DPSK. This corresponds to FR-A-2 712 129.

FIG. 1 shows the block diagram of an emitter. Said emitter has an input Ee, which receives the data $b_k$ to be emitted and comprises a differential coder 10, constituted by a logic circuit 12 and a delay circuit 14. The emitter also comprises a pseudorandom sequence. generator 30, a multiplier 32, a local oscillator 16 and a modulator 18 connected to an output Se, which supplies the DFSK signal.

The logic circuit 12 receives the binary data $b_k$ and delivers the binary data $d_k$. The logic circuit 12 also receives the data delayed by one order or rank, i.e. $d_{k-1}$. The logic operation performed in the circuit 12 is the exclusive-OR on the data $b_k$ and on the delayed compliment of $d_k$ (i.e. on $\overline{d_{k-1}}$):

$$d_k = b_k \oplus \overline{d_{k-1}}$$

The pseudorandom sequence used on emission for modulating the data must have an autocorrelation function with a marked peak (of value N) for a zero delay and the smallest possible secondary lobes. This can be obtained by using maximum length sequences, also called m-sequences, or so-called GOLD or KASAMI sequences in exemplified manner. This pseudorandom sequence designated $\{c_e\}$, has a bit rate N times higher than the rate of the binary data to be transmitted. The duration $T_c$ of a bit of said pseudorandom sequence and which is also known as a chip is consequently equal to $T_b/N$.

The chip rate of the pseudorandom sequence can be several million, or several tens of millions per second.

The attached FIG. 2 is the block diagram of a corresponding receiver of the differential demodulator type. This receiver has an input Er and comprises a matched filter 20, whose pulse response is the time reverse of the pseudorandom sequence used in the emitter, a delay circuit 22 with a duration $T_b$, a multiplier 24, an integrator 26 on a period $T_b$ and a logic decision circuit 28. The receiver has an output Sr, which restores the data.

If x(t) is used for designating the signal applied to the input Er, the multiplier 24 receives the filtered signal $x_F(t)$ and the delayed-filtered signal $x_F(t-T_b)$ The product is integrated on a period equal to or smaller than $T_b$ in the integrator 26, which supplies a signal, whose polarity makes it possible to determine the value of the transmitted bit.

The input filter 20 used in the receiver has a base band equivalent pulse response H(t) and said response must be the time-reverse, conjugate complex of the pseudorandom sequence c(t) used on emission:

$$H(t)=c^*(T_b-t)$$

The signal supplied by such a filter is consequently:

$$x_F(t)=x(t)*H_F(t)$$

where the symbol * designates the convolution operation, i.e.

$$x_F(t) = \int_0^{T_b} x(s) \cdot c^*(s-t) ds.$$

Thus, the matched filter 20 performs the correlation between the signal applied at its input and the pseudorandom spread sequence.

In a gaussian additive noise channel, the signal x(Ft) will consequently be in the form of a pulse signal, the pulse repetition frequency being $1/T_b$. The envelope of this signal is the autocorrelation function of the signal c(t). The information is carried by the phase difference between two successive correlation peaks. Thus, the multiplier output is formed by a succession of positive or negative peaks, as a function of the value of the transmitted bit.

In the case of a radiotransmission in the presence of multiple paths, the output of the matched filter is formed by a succession of correlation peaks, each peak corresponding to a propagation path.

The different signals of the reception chain are represented in FIG. 3.

Line (a) represents the filtered signal $x_F(t)$, line (b) the correlation signal $x_F(t)*x_F(t-T_b)$ and line (c) the signal at the integrator output.

The direct sequence spread spectrum modulation technique has been extensively described in the specialist literature and reference can e.g. be made to the following works:

"CDMA Principles of Spread Spectrum Communication", by Andrew J. VITERBI, Addison-Wesley Wireless Communications Series, "Spread Spectrum Communications", by Marvin K. SIMON et al., vol. I, 1983, Computer Science Press, "Spread Spectrum Systems", by R. C. DIXON, John WILEY and Sons.

This technique is also described in certain articles;

"Direct-sequence Spread Spectrum with DPSK Modulation and Diversity for Indoor Wireless Communications", published by Mohsen KAVEHRAD and Bhaskar RAMAMURTHI in the journal "IEEE Transactions on Communications", vol. COM 35, No. 2, February 1987, "Practical Surface Acoustic Wave Devices", by Melvin G. HOLLAND, in the journal Proceedings of the IEEE, vol. 62, No. 5, May 1974, pp 582–611.

The direct sequence spread spectrum technique has numerous advantages, such as:

Discretion; this discretion is linked with the spread of the transmitted information over a wide frequency band, leading to a low spectral density of the emitted power.

Multiple access: several direct sequence spread spectrum links can share the same frequency band using orthogonal spread pseudorandom sequences (sequences having an intercorrelation function having very low residual noise for all shifts), said technique being known as code distribution multiple access or CDMA.

A good cohabitation with conventional narrow band communications: the same frequency band being shared by systems using a narrow band modulation and those using a broad band modulation. There is only a slight increase in ambient radio noise to narrow band communications and this decreases with the increase in the sequence length. Spread spectrum modulation communications bring about a rejection of narrow band modulations due to the correlation operation performed on reception.

The interception difficulty: a direct sequence spread spectrum transmission is difficult to intercept as a result of the low spectral density and the fact that the receiver must know the spread sequence in order to be able to demodulate the data.

An excellent behaviour in a multi-path environment, where the propagation of the radio wave takes place in accordance with multiple paths using reflection, diffraction and scattering phenomena. Moreover, not infrequently there is no longer a time-stable, direct path between the emitter and the receiver. This multiple path propagation induces parasitic effects, which tend to deteriorate the transmission quality.

Code distribution multiple access (CDMA) transmission systems encounter a difficulty resulting from the interference occurring between a transmission channel using a spread code individual to a particular user and the other channels using other codes individual to other users. If the sequences used were rigorously orthogonal, these interferences would not exist but, in practice, this is not the case.

On designating by $g_i(t)$ and $g_k(5)$ two pseudorandom sequences allocated to users i and k, it is possible to define a coefficient $\mu_{i,k}$ expressing the correlation between these two sequences. This coefficient is equal to the mean, on the duration Ts of one symbol, of the product of the sequences, namely:

$$\mu_{i,k} = \frac{1}{Ts} \int_o^{Ts} g_i(t) \cdot g_k(t) dt.$$

This coefficient represents an autocorrelation if i=k and a inter-correlation if i≠k.

The signal at the output of the correlator corresponding to the user of rank k (i.e. the output of the multiplier 24 of FIG. 2) can be written, as a function of this coupling coefficient:

$$A_k d_k + \sum_i \mu_{i,k} A_i d_i + \frac{1}{Ts} \int_o^{Ts} n(t) \cdot g_k(t) \cdot dt$$

where $A_k$ is the amplitude of the signal individual to the user of rank k, $g_k(t)$ the pseudorandom sequence individual to said user, $d_i$ the transmitted data item and n(t) an additive, gaussian, white noise. In this expression, i ranges between 0 and K, K being the total number of users, but without taking the value k individual to the considered user.

The first term, i.e. $A_k d_k$, makes it possible to find the data item $d_k$, the second corresponding to a correlation with the signals corresponding to the other users. This term is called multiple access interference or MAI. If the sequences are chosen and constructed so as to have limited intercorrelations, the coefficients $u_{i,k}$ are close to zero and the interference effect on the signal of the user k with the other users i remains small.

The existence of this multiple access interference leads to a non-negligible consequence on the capacity of the transmission system, i.e. on the number of simultaneously acceptable users and on the performance characteristics of the system. Moreover, the presence of users emitting a strong signal will increase the effect of multiple access interference on users emitting a weak signal. Users emitting a weak signal could be completely jammed by users emitting stronger signals. For example, in multi-point to point communications, this phenomenon arises when the emitters, emitting with identical amplitudes, are at different distances from the receiver. The signal of the closest emitter will arrive at the receiver with a higher amplitude than the signal emanating from a more remote emitter, taking account of attenuation differences. This effect is known as the near/far effect.

Numerous research has been carried out with a view to reducing this interference phenomenon, namely:

Research on pseudorandom spread sequences: This approach aims at finding a set of sequences having good orthogonality properties. In the ideal case where $\mu_{i,k}=0$ (for i differing from k), the codes are strictly orthogonal and the term corresponding to the multiple access interference is zero. However, as in practice CDMA communications systems are asynchronous, it is mathematically impossible to guarantee this orthogonality for variable time shifts between each system user. In practice, codes are consequently sought having the smallest inter-correlation coefficients between them.

Research on the control of power levels: A strict control of the emission power of the different users of the system aims at ensuring that the power levels received at the receiver are identical for all codes of the CDMA system. This control limits the near/far effect, but as a result of the attenuation phenomenon and fast variations of the radio channel, there are limits to this power control.

The use of adaptive antennas: The idea is to point the antenna in the direction of the sought user, the multiple access interference effect then being reduced.

Research on higher performance receiver structures based on a joint data multi-user detection. The only hypothesis made is that the codes of the system are known to the receiver, but unfortunately this theoretical structure is very complex to implement.

Over the last few years research has been directed at solutions which, although not being of an optimum nature, still provide a definite improvement to performance characteristics compared with those of a conventional detector. Among these solutions, reference can be made to interference cancellation receivers. A distinction can be made between two receiver types, depending on whether they involve a parallel or a successive interference cancellation. These two types of known receivers will be briefly described.

A) A successive interference cancellation receiver comprises:
- a base band signal receiver,
- a first stage on a conventional detector,
- a circuit for selecting the user producing the highest correlation value, (user received with the highest power),
- a decoding of the informations linked with said user for restoring the emitted symbol,
- a regeneration of the base band signal emitted by said user by the spread of the restored symbol with the aid of the spread sequence used,
- a cancellation of the thus regenerated signal in the initial base band signal,
- a reiteration of this process (with the new base band signal obtained) up to the decoding of the lowest power signal.

Such a technique is e.g. described in the article by P. PATEL et al. entitled "Analysis of a Simple Successive Interference Cancellation Scheme in a DS/CDMA System" published in IEEE Journal on Selected Areas in Communications, vol. 12, No. 5, June 1994, pp 796–807. The corresponding receiver is illustrated in the attached FIG. 4. It comprises a base band reception circuit 30, an array of correlators 41, 42, ..., 4$k$, the same number of integrators 51, 52, ..., 5$k$, a circuit 60 for the selection of the maximum of the signals $Z_1, Z_2, \ldots Z_k$ obtained after integration, i.e. $Z_i$, the corresponding data item di being obtained by the sign of $Z_i$, a base band signal regeneration circuit 62 using the pseudorandom sequence of the user i for respreading the data item di, an inverter 66 reinjecting the thus obtained base band signal into the reception circuit, in order to subtract therefrom the part linked with the user i.

Following this initial processing, the circuit determines a new maximum and perform s a new correction and so on.

This interference cancellation procedure is suitable for cases where the relative power levels of the different users have very differing values. Thus, in this case, it is the user which has received with the highest power which is the easiest to decode and it is consequently this user which causes the greatest interference to the other users.

Thus, this process remains highly theoretical and the circuit of FIG. 4 does not appear to have passed beyond the laboratory simulation stage.

B) With regards to parallel interference cancellation receivers, they use:
- a first stage based on a conventional detector (correlator array),
- a generation of an interference signal by each of the system users,
- for each of the users, the cancellation in the signal received of all the interferences produced by the other system users,
- a second correlator and final data estimation stage.

Such a technique is described in the article by R. M. BUEHRER et al. entitled "Analysis of DS-CDMA Parallel Interference Cancellation with Phase and Timing Errors", published in IEEE Journal on Selected Areas in Communications", vol. 14, No. 8, October 1996, pp 1522–1535. The corresponding receiver is illustrated in the attached FIG. 5 in the case of three users. The reception signal r(t) is processed in a first stage constituted by three correlators 101, 102, 103 using the three pseudorandom codes of the users. These correlators supply three decision signals $Z_1^1, Z_2^1, Z_3^1$, which are processed in three estimation circuits 111, 112, 113. The latter supplies signals $\hat{s}_1^1, \hat{s}_2^1, \hat{s}_3^1$, which are obtained by the spread of the signal Z by pseudorandom sequences of the three users and by weighting as a function of the respective powers detected. For each user, the signals $\hat{s}$ of the other users are summated, i.e. respectively $$\sum_{2,3}$$

for the user 1, $$\sum_{1,3}$$

for user 2 and $$\sum_{1,2}$$

for user 3. These sums are subtracted from the reception signal r(t) in a second stage constituted by three subtractors 121, 122, 123, in order to obtain three new signals $r_1, r_2, r_3$, which will in turn be correlated with the pseudorandom sequences of the users, respectively in three correlators 131, 132, 133. Thus, in said second stage are obtained three new decision signals $Z_1^2, Z_2^2, Z_3^2$, to which are made to correspond three signals spread by the corresponding pseudorandom sequences, i.e. $\hat{s}_1^2, \hat{s}_2^2, \hat{s}_3^2$ and so on.

This parallel interference cancellation procedure, unlike the preceding procedure, is appropriate for cases where the relative power levels of the different users have substantially identical values.

In general terms, for constructing a multiple access interference correction signal, there is a need for three informations:
- a clock symbol (Hs),
- binary data of channels I and Q, namely D(I), D(Q),
- the amplitudes of the signals on channels I and Q, i.e. A(I) and A(Q).

In the prior art, there is a very clear distinction between coherent modulation techniques, considered to have better performance characteristics, and non-coherent modulation techniques, considered to be easier to implement. This distinction reoccurs in multiple access interference correction means. These means are all based on a coherent detection, as is e.g. the situation for the two examples which have been described in conjunction with FIGS. 4 and 5.

The present invention breaks with this distinction in the sense that, for obtaining the signals necessary for the formation of an interference signal corresponding to the multiple access noise, it recommends the use of both the non-coherent part of the receiver, namely the differential demodulation means, and the coherent part thereof, namely the two matched filters performing the correlations. This gives a clock symbol signal (Hs) based on a n on-coherent and in this case differential demodulation, and said clock, obtained in this way, is very reliable and accurate. This advantage is particularly important for applications where there are multiple paths and several users. The interference correction signal produced from such a clock signal will be correctly synchronized with the initial data on carrying out the subtraction in the following stage. With regards to the data D(I), D(Q) and the amplitude A(I), A(Q) necessary for the formation of the correction signal, they will be obtained from the coherent means of the receiver, i.e. in practice from matched filters (or correlators).

In other words, the multiple access interference correction means are mixed or composite, in the sense that they are in part based on a coherent process and in part based on a non-coherent process.

DESCRIPTION OF THE INVENTION

More specifically, the present invention relates to a direct sequence spread spectrum differential receiver with mixed control signal formation means for the formation of an interference signal corresponding to the multiple access noise, said receiver comprising:

a) a first channel for processing a first part (I) of the signal received, said first part being the part in phase with the carrier received, said first channel comprising:
  i) first matched filtering means corresponding to a particular ps eudorandom sequence, said first means supplying a first filtered signal ($I_k$),
  ii) first delay means supplying a first delayed, filtered signal ($I_{k-1}$),
b) a second processing channel of a second part (Q) of the signal reoceived, said second part being the part in phase quadrature with the carrier received, said second channel comprising:
  i) second matched filtering means corresponding to said particular pseudorandom sequence, said second means supplying a second filtered signal ($Q_k$),
  ii) second delay means supplying a second delayed, filtered signal ($Q_{k-1}$),
c) a demodulation circuit receiving the first filtered and delayed, filtered signals ($I_k$, $I_{k-1}$) and the second filtered and delayed, filtered signas ($Q_k$, $Q_{k-1}$), said circuit comprising means for calculating a Dot signal equal to ($I_k I_{k-1} + Q_k Q_{k-1}$) and a Cross signal equal to ($Q_k I_{k-1} - I_k Q_{k-1}$),
d) a circuit for the integration and regeneration of the clock symbol (Hs) receiving the Dot and Cross signals and supplying a clock symbol signal (Hs),
said receiver being characterized in that it also comprises:
e) mixed control signal formation means, said signals being constituted by a clock signal (H) from the demodulation circuit and data D(I), D(Q)) and amplitudes A(I), A(Q)) from the matched filtering means,
f) a circuit (200) for the formation of an interference signal corresponding to the multiple access noise, said circuit being controlled by said control signals (H, D(I), D(Q), A(I), A(Q)).

Preferably, the mixed control signal formation means comprise:

a first register connected to the output of the first matched filtering means of the first channel and controlled by the clock symbol signal (Hs) supplied by the clock regeneration circuit, said first register having an output, a second register connected to the output of the first matched filtering means of the second channel and controlled by the clock symbol signal (Hs) supplied by the clock regeneration circuit, said second register having an output, a first sign detector connected to the output of the first register and supplying a first data item (D(I)) individual to the first channel, a second sign detector connected to the output of the second register and supplying a second data item (D(Q)) individual to the second channel, a first circuit for the determination of the absolute value (A(I)) of the signal supplied by the output of the first register, a second circuit for the determination of the absolute value of the signal (D(Q)) supplied by the output of the second register.

Preferably, the circuit for the formation of an interference signal corresponding to the multiple access noise comprises:

pseudorandom sequence spread spectrum means, which are connected to the outputs of the first and second sign detectors, a circuit for the amplification and inversion of the signals supplied by the spread spectrum means, said amplification and inversion circuit having two gain control inputs connected respectively to the outputs of the first and second absolute value determination circuits, said amplification and inversion circuit supplying two base band correction signals.

The receiver defined hereinbefore is able to produce a multiple access interference correction signal. In order to effect said correction, it is necessary to subtract the correction signal from the incident signal. However, as this requires a certain time, subtraction can only take place on an appropriately delayed incident signal. Thus, advantageously, the receiver comprises such a means for delaying the incident signal, so as to synchronize it with the correction signal.

The invention also relates to a direct sequence spread spectrum differential receiver, characterized in that it comprises a plurality of receivers of the type defined hereinbefore, said receivers being grouped in parallel in several cascaded stages, each of the receivers of the same stage operating on a given pseudorandom sequence, the receivers of the same rank in different stages operating with the same pseudorandom sequence, the outputs of the means for forming the multiple access interference correction signal of a receiver of a given rank of a particular stage being connected to the inputs of adders of receivers of a different rank in the following stage, the outputs of the delay means of the receiver of a particular stage being connected to the inputs of adders of the receiver of the same rank in the following stage.

DETAILED DESCRIPTION OF EMBODIMENTS

Before describing certain special embodiments of the invention, certain information will be given on the nature of the signals processed in spread spectrum receivers.

Consideration is given to a pulsation carrier w, phase modulated by a function of the time P(t). The modulated signal can be written:

$$s(t) = A(t)\cos[wt + P(t)]$$

in which A(t) is the amplitude of the signal.

This expression can be developed to:

$$s(t) = A(t)\cos wt \cos P(t) - A(t)\sin wt \sin P(t)$$

By designating I(t) the part A(t)cosP(t), which is in phase with the carrier and Q(t) the part (A(t)sinP(t), which is in quadrature with the carrier, the latter signal can also be written in the form:

$$s(t) = I(t)\cos wt - Q(t)\sin wt$$

It is then appropriate to consider the complex signal S(t):

$$S(t) = U(t)\exp(jwt)$$

with U(t)=I(t)+jQ(t). The true signal s(t) then corresponds to the real part of the complex signal S(t).

Thus, the signal s(t) can then be carried out by the double processing of the parts I(t) and Q(t), which will subsequently be designated I and Q for reasons of simplification.

The processors processing such signals generally receive on two separate inputs the signals I and Q. These signals are obtained by multiplying the reception signal by a wave which is either in phase with the carrier or in quadrature therewith. The processors then perform various processings as a function of the modulations used. Thus, in the case of a phase differential modulation, there are processing operations consisting of forming the sum or difference of delayed or undelayed sample products, such as e.g. $(I_k I_{k-1} + Q_k Q_{k-1})$ and $(Q_k I_{k-1} - I_k Q_{k-1})$ where k designates the rank or order of a sample.

Literature on this subject calls the first expression Dot and the second Cross. These terms result from the fact that the first signal is of the "internal product" or "scalar product" type between two quantities, conventionally designated by a Dot, whereas the second is of the "external product" or "vector product" type, conventionally designated by a Cross.

Figure 1:
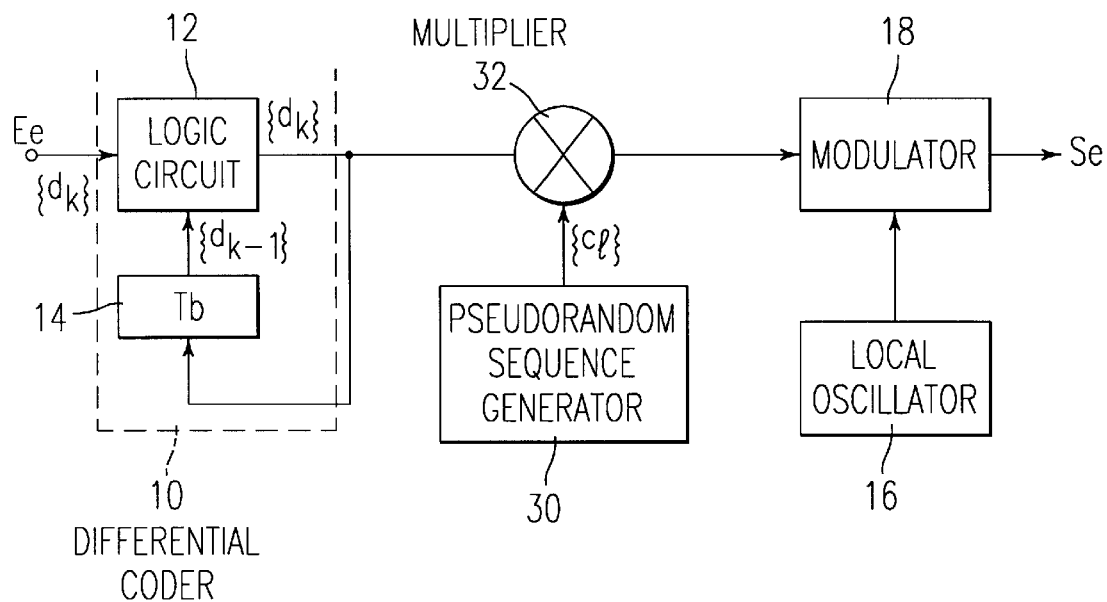
FIG. 1, already described, is a block diagram of a known, spread spectrum emitter.
Figure 2:
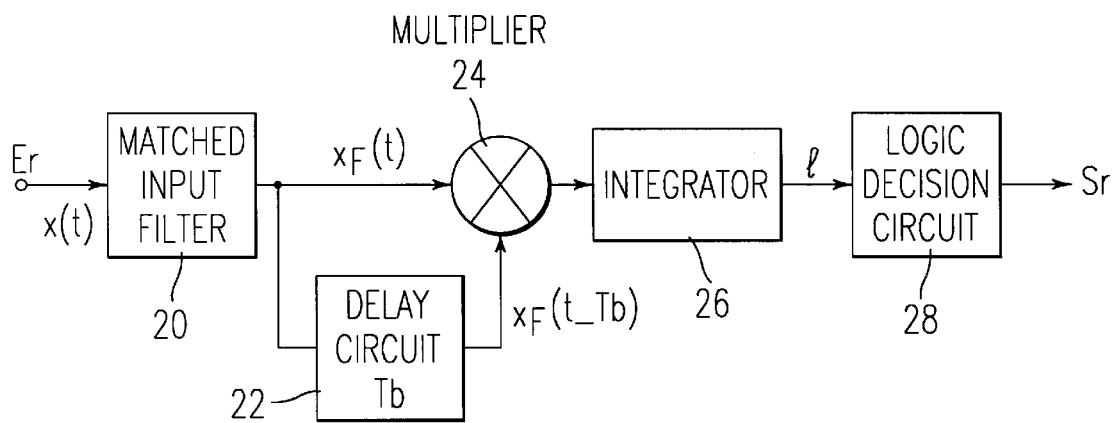
FIG. 2, already described, is a block diagram of a known, spread spectrum receiver.
Figure 3:
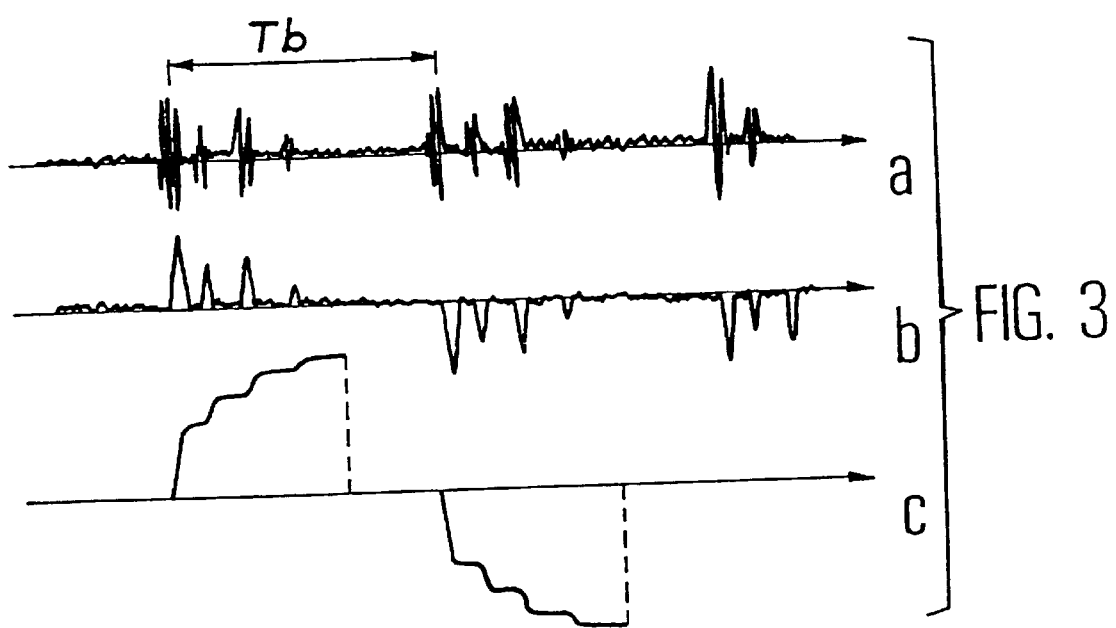
FIG. 3, already described, illustrates the general operation of a receiver like that of FIG. 2.

It is possible to demonstrate that the product of a sample of rank k of signal s(t), i.e. s(k), by a conjugate previous sample, i.e. s*(k−1) and which is calculated in the receiver for demodulating the signal (cf. multiplier 24 in FIG. 2) is, to within the fixed phase rotation, of form:

$$\text{Dot}(k) + j\text{Cross}(k).$$

The Dot signal permits the determination of the phase shift between two successive symbols, whereas the Dot and Cross signals considered together, make it possible to determine the integral number of times π/2 of the phase shift between successive symbols. Thus, said Dot and Cross signals permit the correct, ambiguity-free demodulation when a differential phase modulation has been used on emission.

This, a spread spectrum signal receiver firstly forms the in phase and in quadrature parts I and Q, followed by matched filtering on each of these signals. On the basis of the samples obtained, the receiver calculates the Dot and Cross signals and, on the basis thereof, restores the information carried by the signal received.

Figure 4:
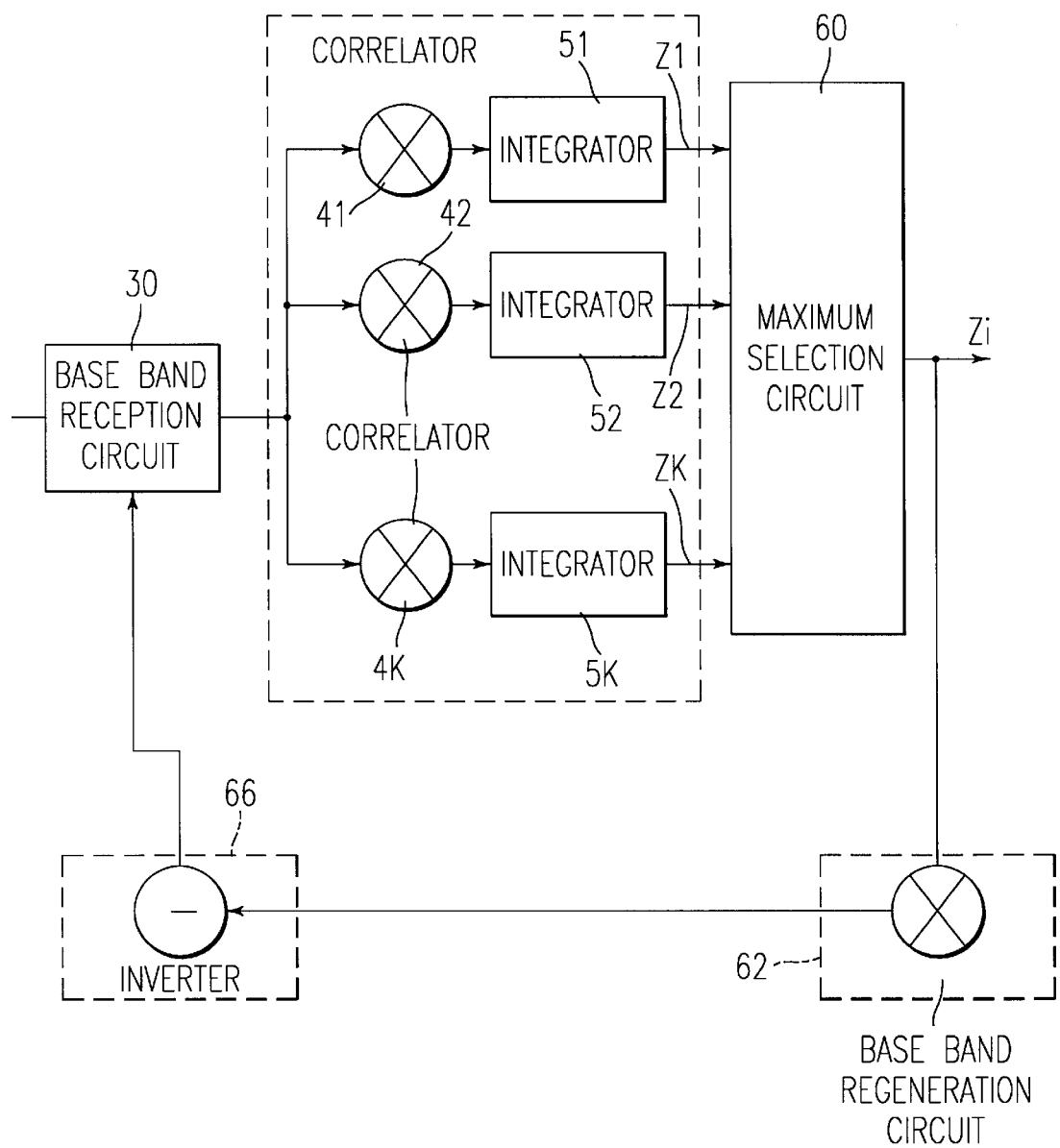
FIG. 4, already described, illustrates a known process for successive corrections of multiple access interference.
Figure 5:
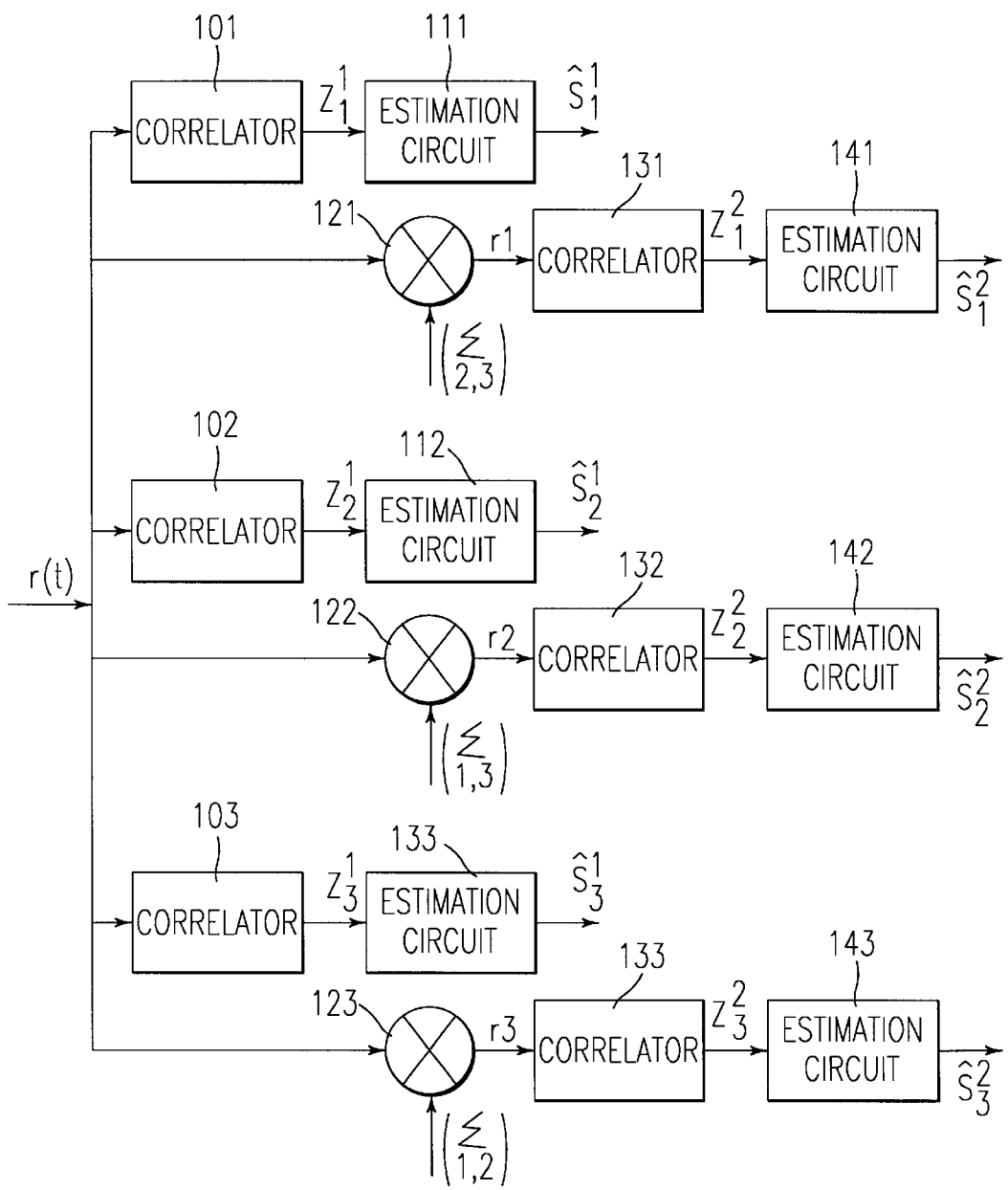
FIG. 5, already described, illustrates a known process for parallel corrections of multiple access interference.

FR-A-2 742 014 describes a receiver implementing this technique. On FIG. 4 of the said document is shown a receiver comprising two similar channels, one processing the in phase part I and the other the in quadrature part Q. The first digital processing channel of the in phase part I with the carrier comprises:

i) first digital means 50(I) able to fulfil a first matched filtering function on the pseudorandom sequence used on emission, ii) first digital means 60(I) able to fulfil a first delay function.

The circuit also comprises a second digital processing channel receiving the second part Q of the signal received, said second part being in phase quadrature with the carrier. Like the first, said second channel comprises:

i) second digital means 50(Q) able to fulfil a second matched filtering function at said pseudorandom sequence, ii) second digital means 60(Q) able to fulfil a delay function.

The circuit described in said document also comprises a multiplication circuit 70 having:

two first inputs, one connected to the output of the first digital filtering means 50(I) and receiving a first filtered signal $I_k$ and the other connected to the output of the first means able to fulfil the delay function 60(I) and receiving a first delayed, filtered signal $I_{k-1}$, two second inputs, one connected to the output of the second digital filtering means 50(Q) and receiving a second filtering signal $Q_k$ and the other connected to the output of a second means able to fulfil the delay function 60(Q) and receiving a second delayed, filtered signal $Q_{k-1}$, means for calculating the two direct products between filtered and delayed, filtered signals of the first and second channels, namely $I_k I_{k-1}$ and $Q_k Q_{k-1}$, and the two crossed products between the filtered signal of one channel and the delayed, filtered signal of the other channel, namely $Q_k I_{k-1}$ and $I_k Q_{k-1}$, means for calculating the sum of the direct products, i.e. $I_k I_{k-1} + Q_k Q_{k-1}$ and the difference of the crossed products, i.e. $Q_k I_{k-1} - I_k Q_{k-1}$.

The circuit described in said document also comprises a clock regeneration and integration circuit 80 receiving the sum of the direct products and the difference of the crossed products. This circuit also comprises a digital programming means 90 containing informations suitable for programming the first and second filtering means 50(I), 50(Q).

The two channels also have first and second shaping and summating circuits 95(I), 95(Q), respectively placed in front of the first and second filtering means 50(I), 50(Q).

Figure 6:
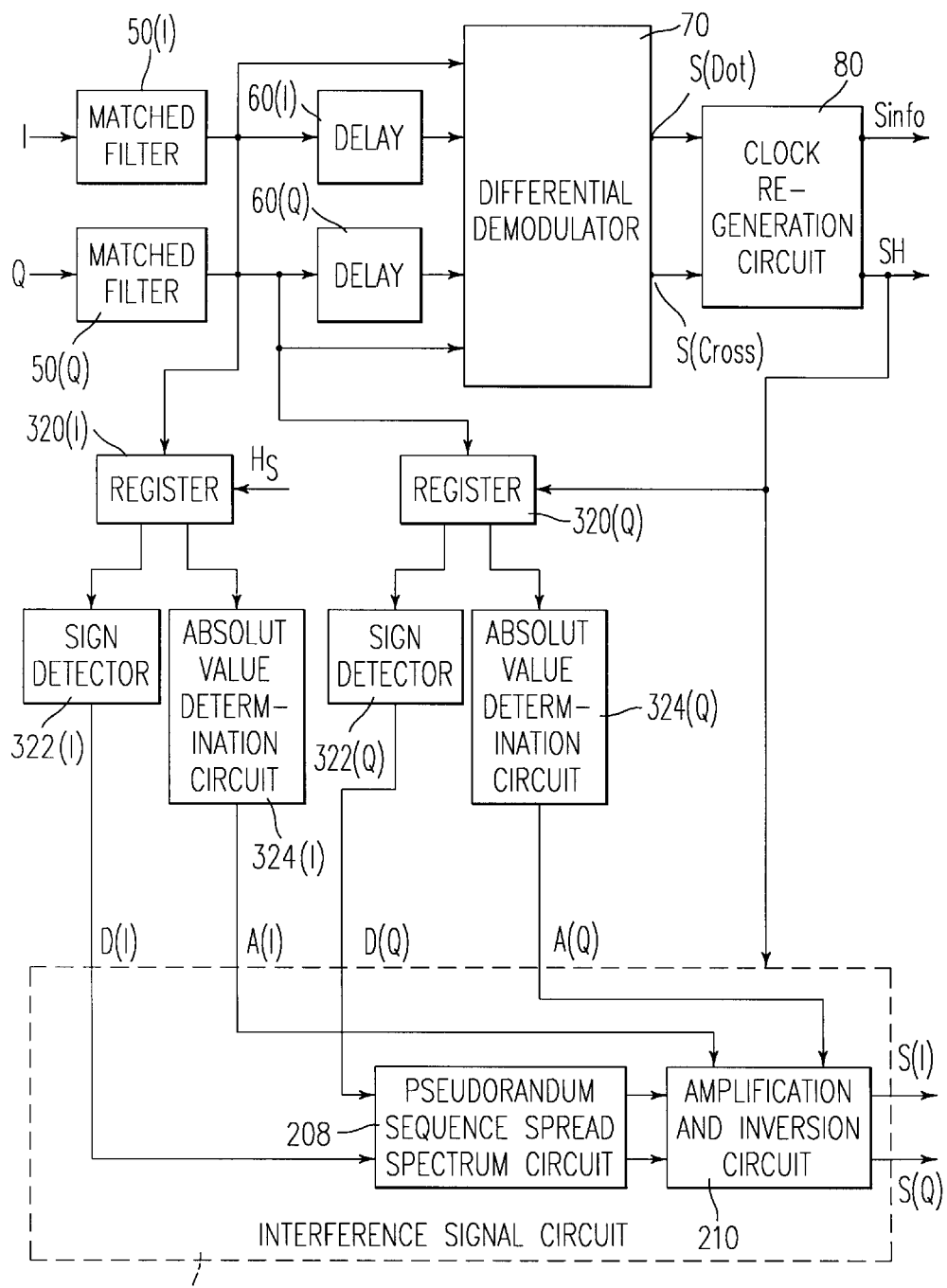
FIG. 6 shows the general structure of a receiver according to the invention.

FIG. 6 shows a receiver according to the invention incorporating certain of the already known means, namely in each channel I and Q, a matched filter 50(I), 50(Q), a delay means 60(I), 60(Q), a differential demodulator 70 supplying Dot and Cross signals and a circuit for the recovery of data (on an output $S_{info}$) and the recovery of the clock symbol Hs (on an output $S_H$).

The circuit shown also comprises:

A) means for forming control signals for the formation of interference signals corresponding to the multiple access noise, said means incorporating:

a first register 320(I) connected to the output of the first matched filtering means 50(I) of the first channel I and controlled by the clock symbol signal Hs supplied by the clock regeneration circuit 80, said first register having an output, a second register 320(Q) connected to the output of the first matched filtering means 50(Q) of the second channel and controlled by the clock symbol signal Hs supplied by the clock regeneration circuit 80, said second register having an output, a first sign detector 322(I) connected to the output of the first register 320(I) and supplying a first data item D(I) individual to the first channel, a second sign detector 322(Q) connected to the output of the second register 320(Q) and supplying a second data item D(Q) individual to the second channel, a first circuit 324(I) for the determination of the absolute value A(I) of the signal supplied by the output of the first register 320(I), a second circuit 324(Q) for the determination of the absolute value A(Q) of the signal supplied by the output of the second register 320(Q), B) a circuit 200 for the formation of an interference signal corresponding to the multiple access noise incorporating:

pseudorandom sequence spread spectrum means 208 connected to the outputs of the first and second sign detectors 322(I), 322(Q), a circuit 210 for the amplification and inversion of signals supplied by the spread spectrum means 208, said amplification and inversion circuit 210 having two gain control inputs respectively connected to the outputs of the first and second absolute value determination circuits 324(I), 324(Q), said amplification and inversion circuit 210 supplying two base band correction signals S(I), S(Q).

Figure 7:
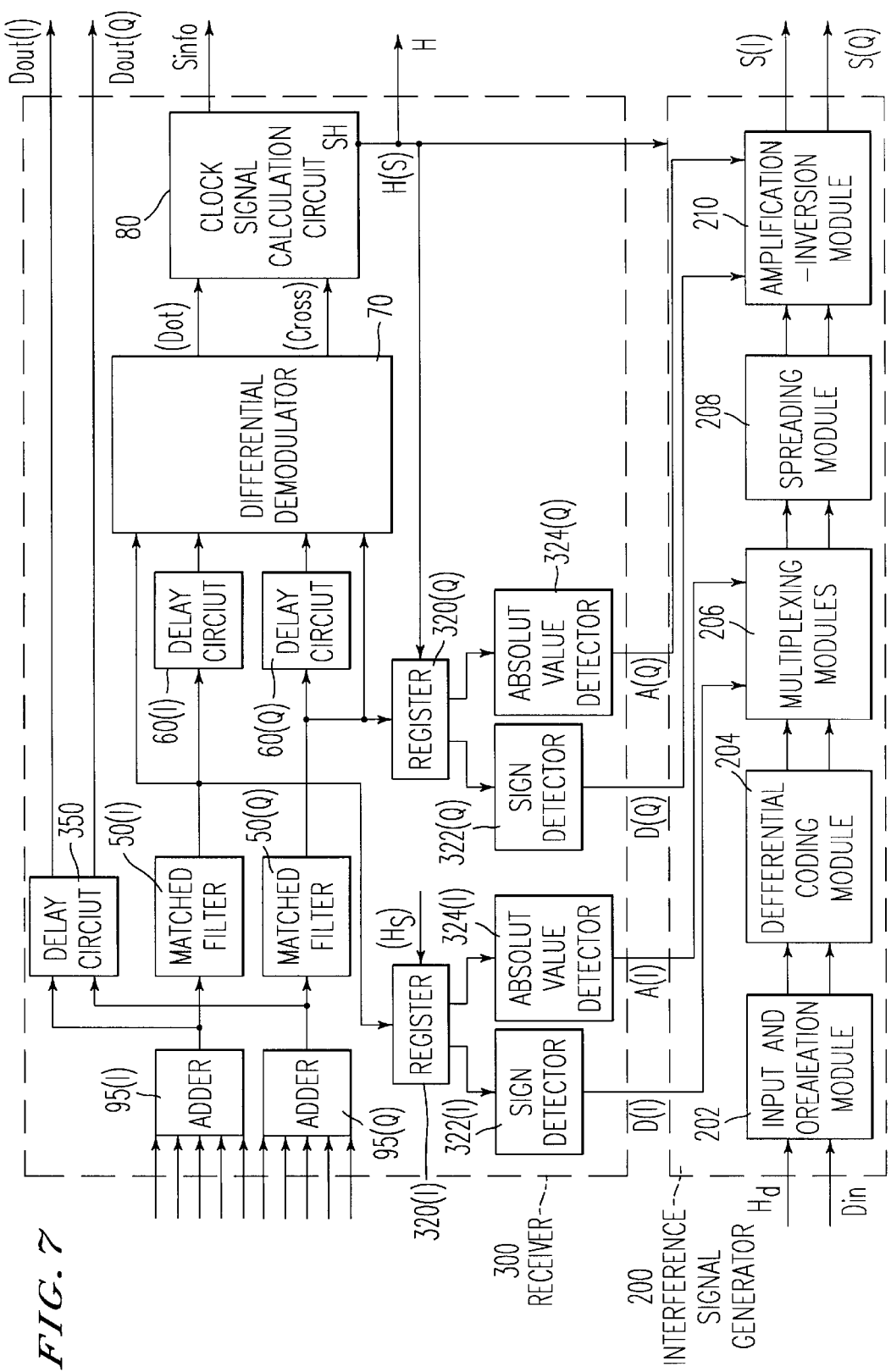
FIG. 7 shows an exemplified embodiment of the receiver according to the invention in a receiver component.

FIG. 7 shows an embodiment of the receiver 300, where there are once again two matched filters 50(I), 50(Q), two delay circuits 60(I), 60(Q), the differential demodulator 70, the circuit 80 for calculating the clock signal Hs, the two registers 320(I), 320(Q), the two sign detector circuits 322(I), 322(Q), the two absolute value detector circuits 324(I), 324(Q) and two adders 95(I), 95(Q), together with a delay circuit 350, which can in practice be a FIFO (First In-First Out) memory. The latter receives the two base band data items extracted from the adders and supplies them to the input of a following stage in the form of signals Dout(I) and Dout(Q). In practice, the FIFO memory 350 can be split into two FIFO memories, one for the signals of channel I and the other for the signals of channel Q.

In FIG. 7 the circuit 200 for generating the interference signal corresponding to the multiple access noise is shown in a particular form, as if it were an emitter for spread spectrum digital transmissions. Such a circuit forms the object of a patent application filed on the same day as the present application by the present applicant and entitled "Circuit for direct sequence spread spectrum digital transmissions with generation of an interference signal". As shown in FIG. 7, said circuit comprises:

a) a first module 202 able to receive on an input data and organize them into symbols and produce on an output a clock signal Hs linked with said symbols, b) a second module 204 for the differential coding of the symbols supplied by the first module 202, c) a third multiplexing module 206 having a first group of inputs connected to the differential coding module 204 and a second group of inputs ($E_I$, $E_Q$) able to receive two data items (D(I), D(Q)) defining the polarity of the interference generation signal, said multiplexing module 206 transmitting one or other of the signals present on one or other of the two input groups, d) a fourth spreading module 208 able to multiply the signal which it receives from the multiplexing module 206 by a pseudorandom sequence, e) a fifth, amplification-inversion module 210 having a signal input connected to the spreading module and having two control inputs (E(I), E(Q)) able to receive two amplification gain control signals (A(I), A(Q)), the outputs of said fifth module supplying either two amplified and inverted signals (S(I), S(Q)) when said fifth module 210 is active, or the signal applied to its input when it is rendered transparent.

Such a circuit is able to operate either as a direct sequence spread spectrum differential signal emitter when the first module 202, second module 204 and fourth module 208 are rendered active, the multiplexing module 206 then transmitting the data from the differential coding module 204, the fifth module 210 being rendered transparent, or as a multiple access interference correction signal generator when the multiplexing module 206 transmits the data applied to the second group of inputs and when the fourth module 208 and fifth module 210 are rendered active, the first module 202 and second module 204 being rendered inactive.

The outputs S(I) and S(Q) can be connected to the inputs of adders of a following stage, said adders also receiving the delayed base band signals supplied by the delay means 350 (FIFO), said circuit delaying the initial base band data so as to synchronize them with the interference correction signal.

Figure 8A:
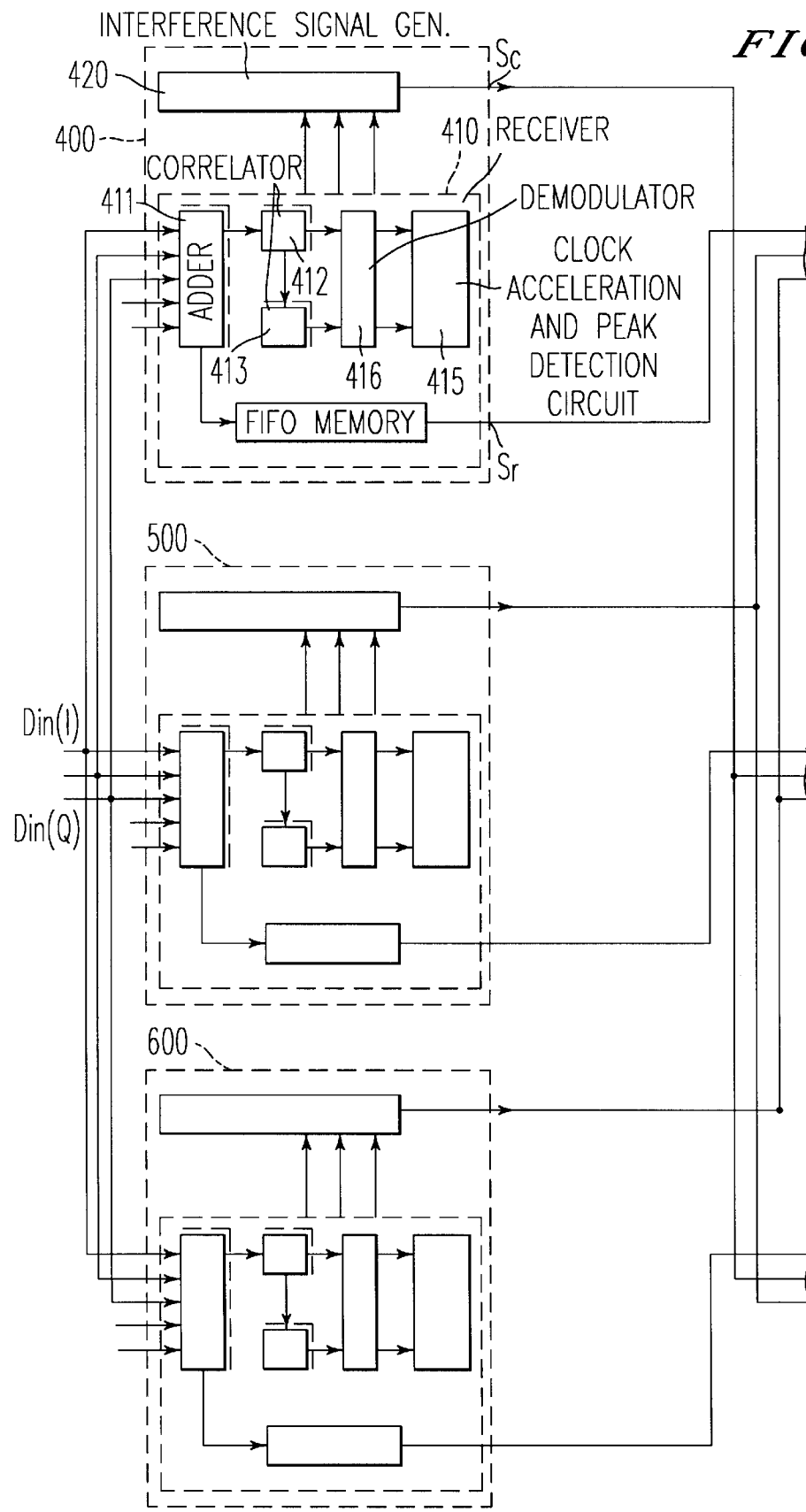
FIG. 8 illustrates a receiver circuit with parallel interference correction, said circuit using several components like that of FIG. 7.
Figure 8B:
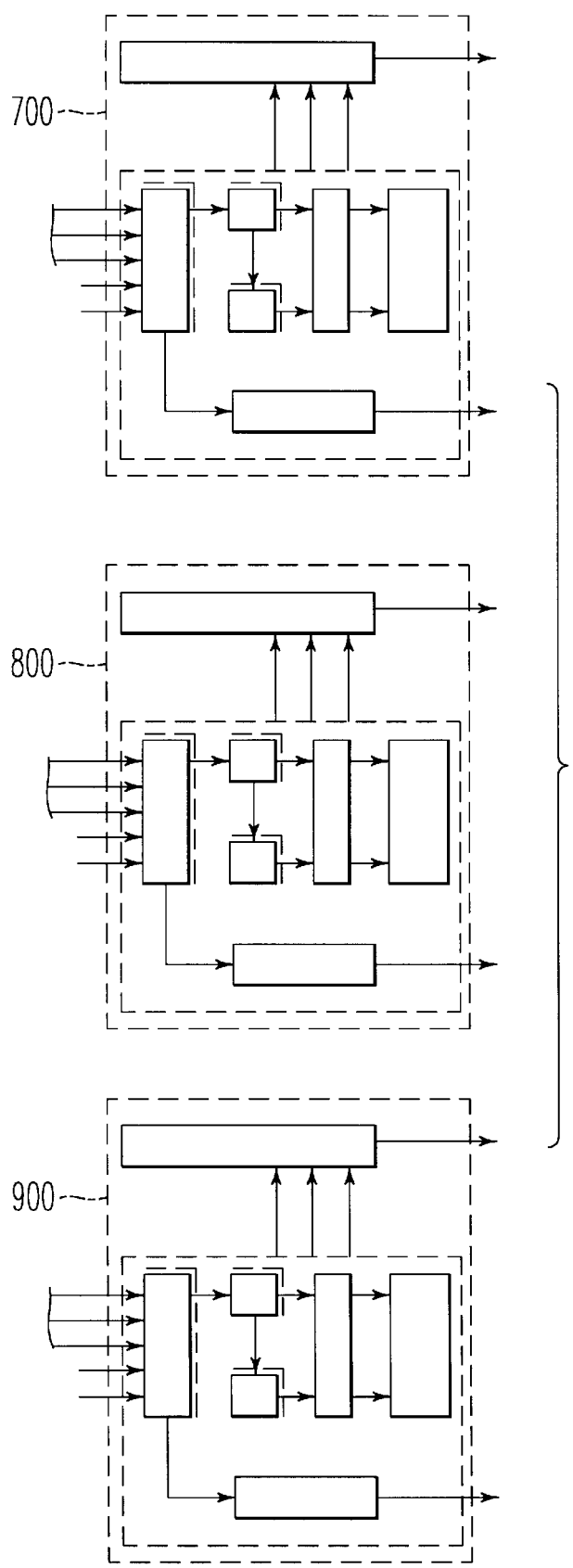

The circuits of FIG. 7 can be integrated into the same component, which will then contain all the functionalities necessary for implementing a digital transmission by spread spectrum with multiple access interference correction. It is merely necessary to group such components in stages and to cascade said stages in order to obtain the desired assembly. Thus, FIG. 8 shows a receiver functioning with three users and performing a parallel interference cancellation. This circuit is constructed with six identical components, three constituting a first stage, namely 400, 500, 600 and the three others 700, 800, 900 constituting a second stage. All the components have the same structure and e.g. incorporate for the component 400:

i. a receiver 410 constituted by an adder module 411, two correlators 412, 413 both for the channel I (in continuous line) and for channel Q (in broken line), a single demodulator 414 for the two channels and supplying the Dot and Cross signals, a clock regeneration and peak detection circuit 415 and a FIFO memory 416, ii. an interference signal generator 420 in accordance with FIG. 6.

Component 400 has an interference correction output Se connected to the inputs of the two components 800 and 900 of the second stage (for correction), whereas the output Sr of the FIFO memory is connected to the input of the second stage component 700. The same applies with respect to components 500 and 600, whereof the generator outputs are connected to the inputs of components (700, 900) (700, 800) and the delayed outputs to the inputs of components 800 and 900.

Figure 9:
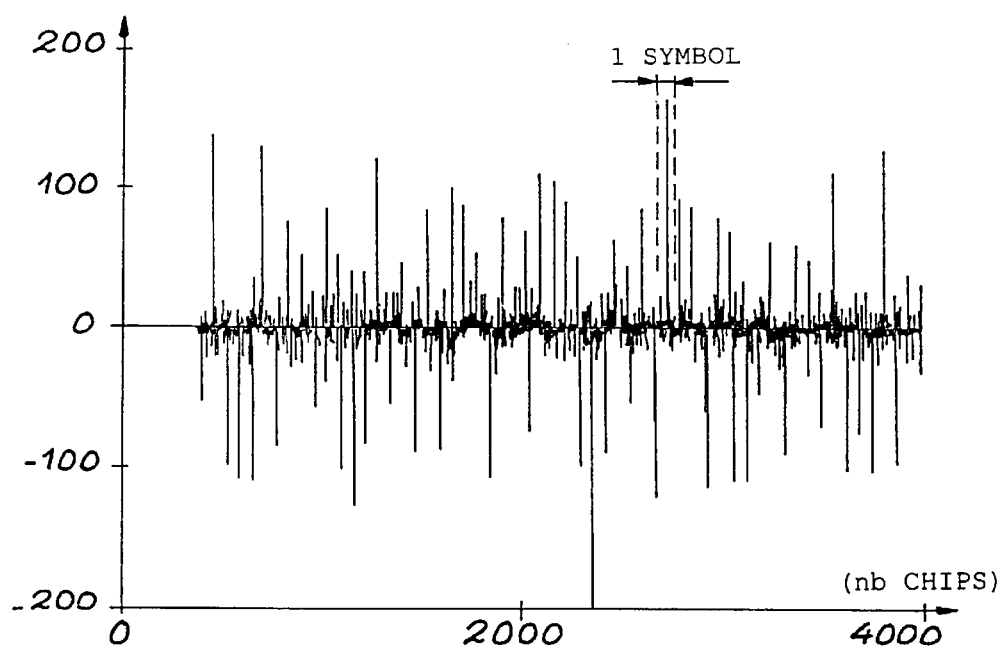
FIG. 9 shows the signal at the output of the first circuit stage of FIG. 8.
Figure 10:
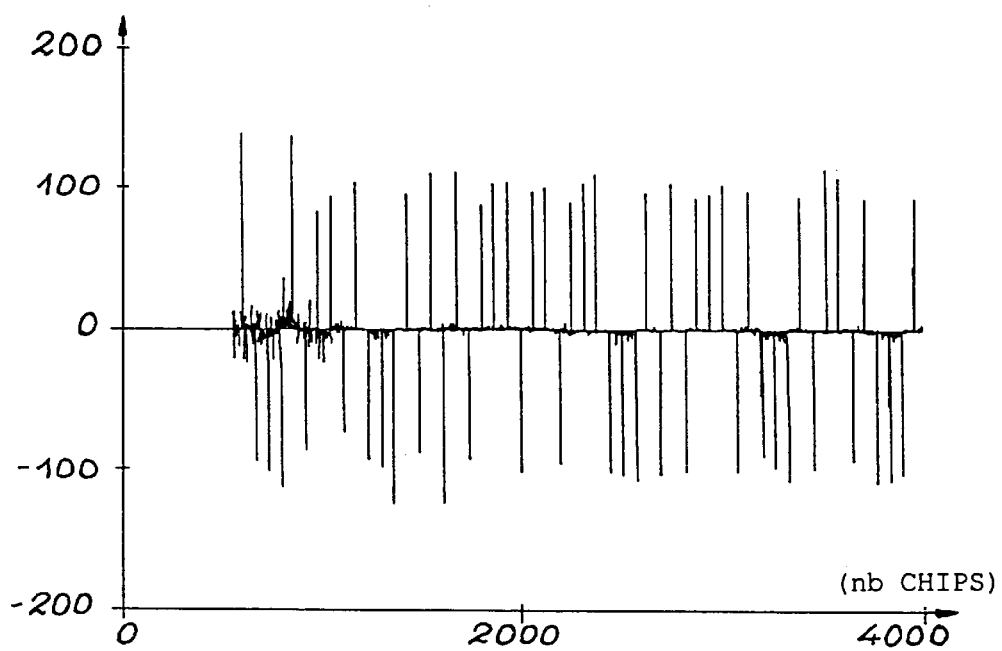
FIG. 10 shows the signal obtained following the multiple access interference correction stage.

FIGS. 9 and 10 illustrate the results obtained with such a circuit. FIG. 9 shows the Dot signal at the output of the first stage (e.g. at the output of circuit 414). In general terms, such a signal comprises a sequence of peaks, which are sometimes positive and sometimes negative, depending on the transmitted binary information value. The interval between two consecutive peaks corresponds to the duration Ts of a symbol. FIG. 9 shows a series of such peaks, mixed with parasitic peaks resulting from interference with the two other users.

FIG. 10 shows the Dot signal of the same user, but taken after the second stage, i.e. following interference cancellation. The improvement is spectacular.

What is claimed is:

1. Direct sequence spread spectrum differential receiver with mixed control signal formation means for the formation of an interference signal corresponding to the multiple access noise, said receiver comprising:
  a) a first channel for processing a first part (I) of the signal received, said first part being the part in phase with the carrier received, said first channel comprising:
    i) first matched filtering means (50(I)) corresponding to a particular pseudorandom sequence, said first means supplying a first filtered signal ($I_k$),
    ii) first delay means (60(I)) supplying a first delayed, filtered signal ($I_{k-1}$),
  b) a second processing channel of a second part (Q) of the signal received, said second part being the part in phase quadrature with the carrier received, said second channel comprising:
    i) second matched filtering means (50(Q)) corresponding to said particular pseudorandom sequence, said second means supplying a second filtered signal ($Q_k$),
    ii) second delay means (60(Q)) supplying a second delayed, filtered signal ($Q_{k-1}$),
  c) a demodulation circuit (70) receiving the first filtered and delayed, filtered signals ($I_k$, $I_{k-1}$) and the second filtered and delayed, filtered signals ($Q_k$, $Q_{k-1}$) said circuit (70) comprising means for calculating a Dot signal equal to ($I_k I_{k-1} + Q_k Q_{k-1}$) and a Cross signal equal to ($Q_k I_{k-1} - I_k Q_{k-1}$),
  d) a circuit (80) for the integration and regeneration of the clock symbol (Hs) receiving the Dot and Cross signals and supplying a clock symbol signal (Hs),
said receiver being characterized in that it also comprises:
  e) mixed control signal formation means, said mixed control signal being constituted by a clock signal (H) from the demodulation circuit and data (D(I), D(Q)) and amplitudes (A(I), A(Q)) from the first and second matched filtering means,
  f) a formation circuit (200) for the formation of an interference signal corresponding to the multiple access noise, said formation circuit being controlled by said mixed control signal.

2. The receiver according to claim 1, wherein the mixed control signal formation means (e) comprise:
  a first register (320(I)) connected to the output of the first matched filtering means (50(I)) of the first channel and controlled by the clock symbol signal (Hs) supplied by the clock regeneration circuit (80), said first register having an output,
  a second register (320(Q)) connected to the output of the second matched filtering means (50(Q)) of the second channel and controlled by the clock symbol signal (Hs) supplied by the clock regeneration circuit (80), said second register having an output,
  a first sign detector (322(I)) connected to the output of the first register (320(I)) and supplying a first data item (D(I)) individual to the first channel,
  a second sign detector (322(Q)) connected to the output of the second register (320(Q)) and supplying a second data item (D(Q)) individual to the second channel,
  a first circuit (324(I)) for the determination of the absolute value (A(I)) of the signal supplied by the output of the first register (320(I)),
  a second circuit (324(Q)) for the determination of the absolute value of the signal (D(Q)) supplied by the output of the second register (320(Q)).

3. The receiver according to claim 2, wherein the formation circuit (200) for the formation of an interference signal corresponding to the multiple access noise comprises:
  pseudorandom sequence spread spectrum means (208), which are connected to the outputs of the first and second signal detectors (322(I), 322(Q)),
  a circuit (210) for the amplification and inversion of the signals supplied by the spread spectrum means (208), said amplification and inversion circuit (210) having two gain control inputs connected respectively to the outputs of the first and second absolute value determination circuits (324(I), 324(Q)), said amplification and inversion circuit (210) supplying two base band correction signals.

4. The receiver according to claim 1, also comprising:
  a first adder (95(I)) placed at the top of the receiver (300), upstream of the first matched filtering means (50(I)), said adder having an input receiving the first in phase part (I),
  a second adder (95(Q)) placed at the top of the receiver (300) upstream of the second matched filtering means (50(Q)), said adder having an input receiving the second in quadrature part (Q),
  a delay means (350) receiving the signals supplied by the first and second adders (95(I), 95(Q)) and supplying on two outputs (Dout(I), Dout(Q)) the corresponding signals delayed in such a way that they are synchronized with the signals supplied by the outputs (S(I), S(Q)) of the multiple access interference signal formation circuit (200).

5. The direct sequence spread spectrum differential receiver according to claim 2, further characterized in that it comprises a plurality of receivers (400, 500, 600, 700, 800, 900), said receivers being grouped in parallel in several cascaded stages, the receivers of the same stage (400, 500, 600) (700, 800, 900) each operating on one given pseudorandom sequence, the receivers of the same rank in different stages (400, 700) (500, 800) (600, 900) operating with the same pseudorandom sequence, the outputs (S(I), S(Q)) of the formation means (200) for forming the interference signal corresponding to the multiple access noise of a receiver of given rank of a particular stage being connected to the inputs of the adders (411) of different rank receivers in the following stage, the outputs (Dout(I), Dout(Q)) of the delay means (350) of the receiver of a particular stage being connected to the inputs of adders of the same rank receiver in the following stage.

* * * * *